United States Patent
Bass et al.

(10) Patent No.: US 6,549,956 B1
(45) Date of Patent: Apr. 15, 2003

(54) MECHANISM FOR CONNECTING DISPARATE PUBLICATION AND SUBSCRIBE DOMAINS VIA THE INTERNET

(75) Inventors: Michael A. Bass, San Jose, CA (US); Vernon E. McGeorge, Jr., San Jose, CA (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/201,635

(22) Filed: Nov. 30, 1998

(51) Int. Cl.[7] .............................................. G06F 9/00
(52) U.S. Cl. ........................ 709/328; 709/204; 709/205; 709/206; 709/207; 709/230; 709/232; 709/329
(58) Field of Search ................................ 709/202, 221, 709/231, 302, 204–207, 230–232, 328, 329

(56) References Cited

U.S. PATENT DOCUMENTS

| | | | | |
|---|---|---|---|---|
| 4,414,620 A | * | 11/1983 | Tsuchimoto et al. ........ | 364/200 |
| 5,742,607 A | * | 4/1998 | Beighe et al. .............. | 370/419 |
| 5,768,528 A | * | 6/1998 | Stumm ....................... | 709/231 |
| 5,790,789 A | * | 8/1998 | Suarez ....................... | 709/202 |
| 5,796,742 A | * | 8/1998 | Klotzbach et al. .......... | 370/466 |
| 5,845,090 A | * | 12/1998 | Collins, III et al. ........ | 709/221 |
| 5,870,605 A | * | 2/1999 | Bracho et al. .............. | 709/302 |
| 5,937,162 A | * | 8/1999 | Funk et al. ................. | 709/206 |
| 5,940,823 A | * | 8/1999 | Schreiber et al. ........... | 707/200 |
| 6,021,443 A | * | 2/2000 | Bracho et al. .............. | 709/241 |
| 6,041,365 A | * | 3/2000 | Kleinerman ................ | 709/328 |
| 6,125,352 A | * | 9/2000 | Franklin et al. ............. | 705/26 |
| 6,163,809 A | * | 12/2000 | Buckley ..................... | 709/204 |
| 6,185,613 B1 | * | 2/2001 | Lawson et al. ............. | 709/224 |

* cited by examiner

*Primary Examiner*—Nabil El-Hady

(57) ABSTRACT

The invention uses two channel adapters to couple to publication and subscription (PUB/SUB) systems together via the Internet. Each channel adapter is based on the existing PUB/SUB engine of that domain, as well as the protocol used in the network channel between the adapters. For transport across the network, the inventive adapters convert the event information into a format acceptable by the network. The delivered information is then reconverted back into the event format for use in the other domain. To guarantee delivery across the network, the inventive adapters use plurality of states and status messages to indicate the status of delivery, receipt, and publication of the events. The communication between the adapters is bidirectional such that one pair of adapters manages all event traffic between two publish/subscribe domains. The adapters store the events in repositories, and maintain separate queues for inbound and outbound events.

20 Claims, 3 Drawing Sheets

MECHANISM FOR CONNECTING DISPARATE PUBLICATION AND SUBSCRIBE DOMAINS VIA THE INTERNET

RELATED APPLICATIONS

Reference is made to the following and commonly assigned U.S. Pat. No. 6,405,266, issued Jun. 11, 2002 and entitled UNIFIED PUBLISH AND SUBSCRIBE PARADIGM FOR LOCAL AND REMOTE PUBLISHING DESTINATIONS, which is hereby incorporated herein by reference.

TECHNICAL FIELD OF THE INVENTION

This invention relates in general to Internet communications, and in specific to connecting systems that are using different publication/subscribe communication mechanisms.

BACKGROUND OF THE INVENTION

Publication and subscribe (PUB/SUB) is a mechanism for the distribution of information in a computer system or domain. A broker is used to send information to interested parties. An individual would construct a process that would detail the particular types or forms of information that the individual is interested in receiving. The process would then subscribe with the broker to receive such information. Processes that desire or are required to share information, send the information to the broker. The broker then sends the information to subscribed processes. Note that subscribing processes do not have any knowledge of the sending process. Likewise, the sending process does not have any knowledge of the subscribing processes.

However, a problem arises with two different domains desire to transfer information. Different enterprises rely on different hardware/software. Therefore, it is reasonable to assume that there may exist disparate PUB/SUB engines between two enterprises. A communication solution based on a single PUB/SUB engine will not be acceptable.

Most enterprises guard their Internet access with a firewall. These firewalls would normally restrict PUB/SUB traffic through them. One solution is to drill a hole through the firewall, however, experience has shown that political and bureaucratic difficulties can delay this process by months. Moreover, the hole creates a breach in the security of the firewall.

Another solution to this problem is to use the secure socket layer, and define a particular port for PUB/SUB traffic. However, the ports that would be needed would be the ports to web servers. These ports are well recognized port numbers. Moreover, their use for PUB/SUB would preventing the web servers from being used by other systems. Thus, this solution also has security concerns as well as system performance concerns.

Therefore, there is a need in the art for a mechanism to link to disparate PUB/SUB domains together without compromising security, reducing performance, be easy to implement, and still allow for information transfer between the two domains.

SUMMARY OF THE INVENTION

These and other objects, features and technical advantages are achieved by a system and method which uses channel adapters between two enterprises. There are two halves comprising two channel adapters to each channel, with each channel adapter residing within an enterprises domain. Each channel adapter is based on the existing PUB/SUB engine of that domain, as well as the protocol used in the network channel between the channel adapters.

Each channel adapter is initialized with a set of events it will export to its peer at the other domain. The two channel adapters handshake with these sets of events. Process adapters within each domain can then publish events of the exported type and expect the event to be carried to the other domain via the network protocol. Likewise, a process adapter can subscribe to an event type from a channel adapter that is listed on an event type list from its peer channel adapter. When an event is received via the channel adapter and re-published into the domain, the subscribing process adapter will receive the event.

For transport across the network, the inventive channel adapters convert the event information into a format acceptable by the network. The delivered information is then reconverted back into the event format for use in the other domain. An added benefit of this conversion, is that the network protocol may be changed without affecting the rest of the system. Thus, a slow SMTP connection may be improved to a TCP/IP connection, given firewall constraints, without modifying any other system. To guarantee delivery across the network, the inventive channel adapters use plurality of states and status messages to indicate the status of delivery, receipt, and publication of the events. The communication between the channel adapters is bidirectional such that one pair of channel adapters manages all event traffic between two publish/subscribe domains. The channel adapters store the events in repositories, and maintain separate queues for inbound and outbound events.

Therefore, it is a technical advantage of the present invention that existing holes in the firewall are for communications between PUB/SUB domains.

It is another technical advantage of the present invention that it provides a guaranteed message delivery service between disparate PUB/SUB domains.

It is a further technical advantage of the present invention that it provides a separation for purposes of administration between the domains.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE INVENTION

Figure 1:
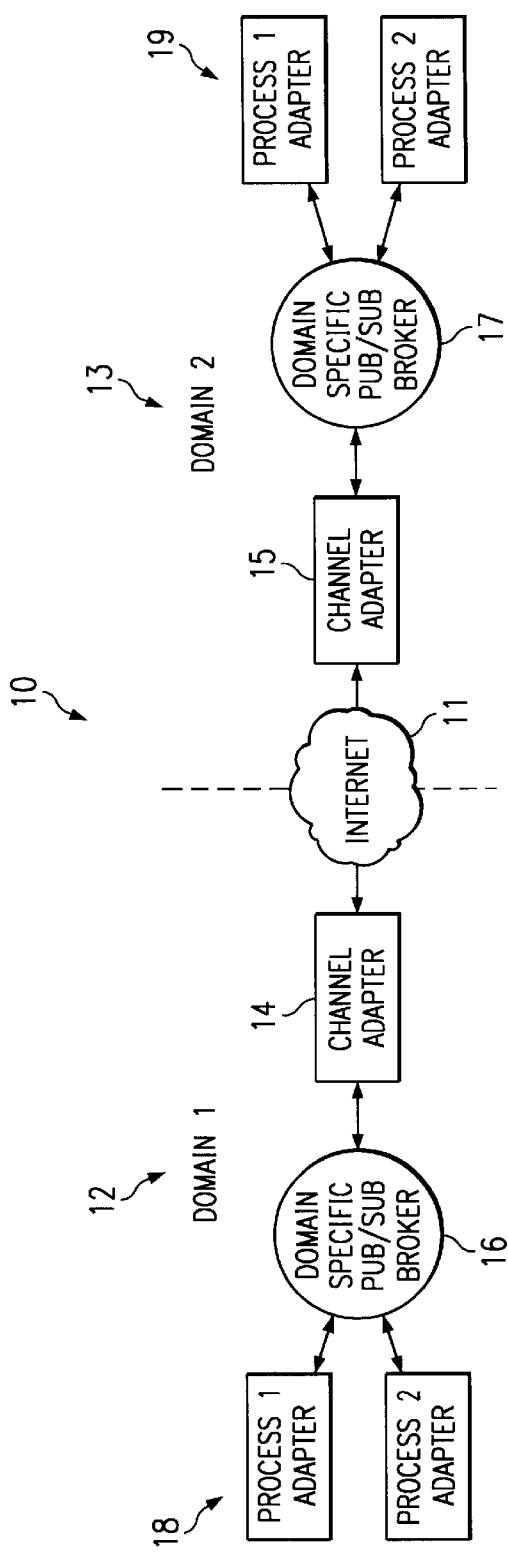
FIG. 1 depicts block diagram of the inventive channel adapters in operation in a system.

FIG. 1 depicts a high level view 10 of two domains, domain 1 12 and domain 2 13. The domains may be two separate corporations acting as business partners. Each domain represents a separate and distinct network of computers within the corporations Intranet. The two domains communicate via the Internet 11. Each domain includes an inventive channel adapter 14, 15, and a domain specific publication/subscription (PUB/SUB) service 16, 17. PUB/SUB service is the message broker service used within the domain. Note that the services may be the same or different. Each domain is running various process adapters 18, 19, only two of which are shown in each domain. Note that each domain could have fewer or more process adapters. The process adapters are communicating with business applications (not shown) running on each domain. An example of a business application would be a product order entry system that needs to interact with other business applications.

The inventive channel adapters 14 and 15 permit dissimilar systems to communicate with each other. The adapters acts as a proxy or an agent for communications and data exchanges between the business applications. Each adapter interfaces with its respective broker and the Internet. Note that although the Internet is depicted and described herein, other networks, such as a WAN or LAN, may be used in place of the Internet. Thus, the broker views the adapter as another process adapter within the domain to which events are published or subscribed. Furthermore, the channel adapter is configured by the domain administrator in the same manner as a process adapter in that the adapter is represented on an administrator screen as an icon which can be set to specify which events couple which processes (including the adapter). The adapter also converts communications and data into a format for transmission on the Internet (or other network). The format may use transmission control protocol/Internet protocol (TCP/IP), simple mail transport protocol (SMTP), File Transfer Protocol (FTP), or whatever protocol is useable by the connecting network. Thus, the flow of information for FIG. 1 is as follows. An event originating in a process adapter 18 in domain 1 12 is delivered to the subscribing channel adapter 14. This event would be transformed into (for example) an e-mail via SMTP, and mailed from the channel adapter through the Internet to domain 2 13. The e-mail is received by the channel adapter 15 and re-transformed back into the event. The channel adapter then delivers the event to any subscribing process adapters within the domain.

Figure 2:
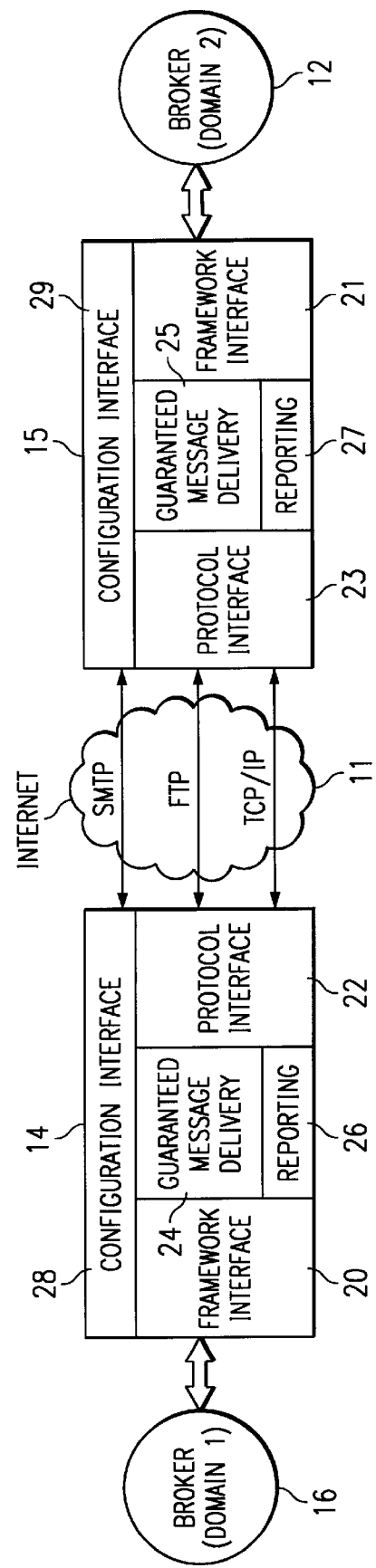
FIG. 2 depicts a block diagram of the internal aspects of the inventive channel adapters.

FIG. 2 depicts the arrangement and interaction of the elements of the inventive channel adapters with respective brokers and the Internet. Each channel adapter includes a framework interface 20, 21. This interface comprises the domain specific protocols that enable the channel adapter to couple with the domain broker 16, 17. Thus, the framework interface facilitates the publishing of events to the broker from the channel adapter and also the subscription to events from the broker. Each channel adapter includes a protocol interface 22, 23. This interface comprises the network specific protocols that enable the adapter to couple with the Internet 11. The protocol interface facilitates the conversion of the events into a network transportable format, e.g. e-mail, and vice versa. Each channel adapter also includes a configuration interface 28. This interface allows the channel adapter to be configured by an administrator. The administrator (not shown) could select the protocols used for the interfaces and specify what events or types of events would flow through the channel adapter and configures protocol specific parameters, e.g. e-mail addresses. Note that each domain would have its own administrator. Each channel adapter also includes a guaranteed message delivery mechanism 24, 25. This mechanism receives, stores and transmits events, as well as monitors and tracks the delivery states of the events. The delivery state of an event transitions as the two channel adapters process the event. The state of the event would start with an outbound send state on the sending channel adapter of the network, and would end with both an outbound acknowledge state on the sending channel adapter and an inbound acknowledge state on the receiving channel adapter. At the point in time when the state is inbound acknowledged, then the sending channel adapter knows that the event has been published within the PUB/SUB domain on the receiving side of the network.

Each channel adapter also includes reporting mechanism 26, 27. This mechanism informs the administrator of the status of the events being processed by the adapter. The administrator could determine if there are any events that are stuck, and the state in which they are stuck. This would permit the administrator to perform error reporting to the system, as well as initiate recovery mechanisms. The reporting mechanism 26 of FIG. 2 is responsible for detecting events that are less than fully acknowledged for more than predetermined threshold of time and reporting the existence of these events to system or a system personnel. The presence of these events indicates a possible breakdown in the channel protocol. If event acknowledgment semantics were preserved, these could also indicate a breakdown in the end-to-end business processes. This mechanism scans all of the less that fully acknowledged repository states (OS, OP, OH, OM, IR, and IM) for repository files that are not progressing along the expected state transitions. This mechanism then complies a report with a summary list of these files which may be sent to the local domain or the remote domain via email or publication of a channel status event. This mechanism also monitors the performance of the outbound transmitting thread and inbound receiving thread, and reports its findings as above. This mechanism may also implement some automatic recovery mechanisms.

Note that the terms publish and subscribe should not be used in describing the flow of control in sending an event across the system. For example, assume process adapter 1 19 of domain 2 13 has an event that is to be shared with any interested process adapters 18 of domain 1 12. The sending channel adapter 15 will receive the event from the process adapter 19 within its domain by subscribing to the event with the broker 17. Thus, when the event is published by the originating process adapter 19, the sending channel adapter 15 will receive the event, reformat the event and send it to the channel adapter 14 of domain 1 12 via Internet 11. The receiving channel adapter 14 reformats the event, and then publishes the event to the broker 16, which republishes the event to subscribing process adapter 18 within domain 1 12.

Thus, prior to transfer of events between the domains, the respective process and channel adapters of the domains must be configured to send and receive the different events. The mechanism for configuring the adapters is as follows. The configuration begins when an adapter signals the administrator that it has a new event to publish to interested processes. For example, assume process adapter 1 19 of domain 2 13 is publishing the new event. The administrator would configure the broker 17 to list channel adapter 15 as a subscriber to the event. Thus, adapter 15 would receive the event from the process, when the process adapter publishes the event. The administrator, via configuration interface 29, would configure the channel adapter to send the event over the Internet to channel adapter 14 of domain 1. The channel adapter 15 would signal the channel adapter 14 that a new event is going to be received by channel adapter 14, and sends the updated export list to the other channel adapter. The channel adapter of domain 2 becomes capable of exporting the event. The administrator of domain 1 would configure the channel adapter 14 to publish the event to interested process adapter in domain 1. Note that in a PUB/SUB system, the publishers have no knowledge of the subscribers, and the subscribers have no knowledge of the publishers, as the brokers route published events to interested subscribers. Further note that each administrator is connected to each adapter within the domain managed by the administrator.

Figure 3:
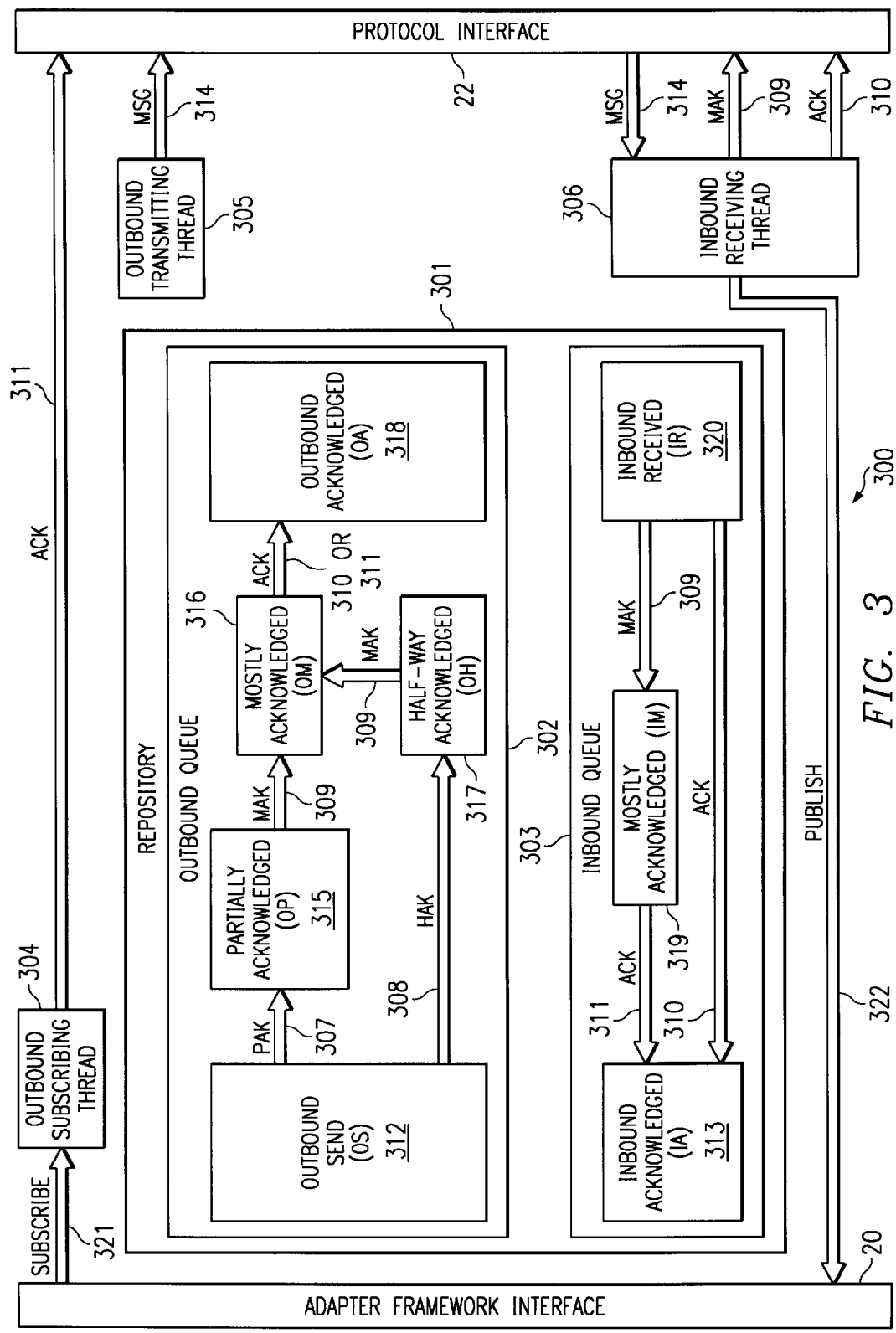
FIG. 3 depicts a block diagram of transition states of the operation of the inventive channel adapters.

FIG. 3 depicts the delivery states of the guaranteed message delivery mechanism 24. Note that each channel adapter is bi-directional, meaning that events flow both ways through the channel adapter, and thus each channel adapter would include an outbound queue 302 and an inbound queue 303 in its repository 301. During operations, an outbound message is placed into the outbound queue in the sending channel adapter, while an inbound message is placed into the inbound queue of the receiving channel adapter. However, for sake of simplicity only one channel adapter is shown in FIG. 3.

The repository 301 is set of message queues in persistent storage that hold in-process and recently processed events flowing through the channel adapter. By design, all states can be derived from the contents of the repository, including those required to report problems and log normal activity. The outbound queue 302 is that portion of the repository dedicated to events exported from domain of this channel adapter to the other domain. The inbound queue 303 is that portion of the repository dedicated to events imported from the other domain to this domain. Note that the acknowledgments shown in FIG. 3 depend on the both the event and on the protocol used by the channel. It is important to recognize that there are two levels of acknowledgment involved in the operation of the two process adapters and the two channel adapters that connect them. Within a publish/subscribe domain, an event may be un-acknowledged, automatically acknowledged, or manually acknowledged at the framework level. As an alternative, the processes themselves may choose to publish events in response to receiving other events. These events are in effect acknowledgments, however to the channel adapter these look like unacknowledged events. All of these forms of acknowledgments occur at the framework level. At the protocol level, all communications between the channel adapters occur within the context of guaranteed message delivery. Thus, all messages, even those that are not acknowledged at the framework level, are acknowledged at the protocol level. This allows for implementation of guaranteed message delivery and problem reporting.

The channel acknowledgment protocol framework includes a Partially Acknowledged (PAK) signal 307. PAK 307 is used with a store and forward channel protocol (SMTP), and means that the event has been successfully transmitted via the protocol. Note other protocols could be used. For SMTP, this means that the SMTP server has accepted the event message for delivery. There is no guarantee that the event will ever be delivered to the peer channel adapter or to any process adapter within the other PUB/SUB domain. It is appropriate to retry transmission of PAK events and to report a problem if the message remains in the PAK state for more than a short time. Note that PAKs are not received from the Internet, but are internally determined within the channel adapter from the channel adapter's interaction with the protocol, i.e. completion of the protocol without errors.

Another acknowledgment is Half-Way Acknowledged (HAK) signal 308. HAK 308 is used with a shared server channel protocol (HTTP, FTP), and means that the event has been successfully delivered to the server shared by both domains. There is no guarantee that the other domain will ever pick up the event from that server or that the event will ever be delivered to subscribing process adapter within the other domain. It is appropriate to retry delivery to the shared server, even though the message is already there and no action by the sending channel can improve this situation, since a return acknowledgment may have been lost. Moreover, it is appropriate to report a problem if a message remains in the state HAK for more than a short time. Note that HAKs are not received from the Internet, but are internally determined within the channel adapter from the adapter's interaction with the protocol, i.e. completion of the protocol without errors.

Another acknowledgment is Mostly Acknowledged (MAK) signal 309. MAK 309 is used with any channel adapter protocol, and means that the event has been received by the channel adapter on the other domain for re-publishing with that publish/subscribe domain. There is no guarantee that the message was ever delivered to any process within that domain. A MAK will move an event in either the OP 315 and OH 317 states in the outbound queue into the OM state 316, and will move an event in IR state 320 in the inbound queue into the IM state 319. Note that MAKs are sent out from the channel adapter over the Internet, and each MAK would include a tag line that identifies the message type as MAK, as opposed to MSG or ACK, and contains the unique event ID. Note that it is appropriate to retry MSG in MAK state. If ACK was lost, the retry will cause a new ACK to be sent. Further note that the MAK signal and the MAK state can be used to support ordered delivering by channel adapters. For example, first channel adapter sends out events E20, E21, and E22, with E21 being lost in transmission. The second channel then sends MAK 20, 22. The second channel adapter processes E20 and sends ACK 20, but holds processing on E22. The first channel adapter notes that a MAK 21 has not been received, and therefore resends E21. The second channel adapter receives E21 and sends out MAK 21, and then processes E21 and E22 and sends out ACK 21 and ACK22.

Another acknowledgment is Acknowledged (ACK) signal 310. ACK 310 is used with any channel protocol, and means that the event has been delivered to the process adaptors to the other side. ACK 310 is used when the event is to be un-acknowledged (framework level) by a process. Note that ACK 311 is an acknowledgment (framework level) either manual or automatic by the receiving process, and that this acknowledgment has been received by the adapter that re-published the event. Note that all events transmitted between channel adapters are acknowledged, therefore ACK 310 means that the remote adapter has received and republished the event to the broker within its domain. Again note that the framework level acknowledgment ACK 311 sent by an process is not the same as the protocol level ACK 310 sent by the adapter, and if ACK 311 is required then ACK 310 will not be sent. The process acknowledgment 311 is its own separate event which must be handled by the adapters the same way that all other events are handled, i.e. it is subject to guaranteed message delivery. The ACK 310 is an internal adapter acknowledgment that is used to provide guaranteed message delivery, support the process level acknowledgment semantics, and provide a mechanism for timely and accurate reporting of communications problems between the two publish/subscribe domains. Note that ACKs 310 are sent out from the adapter over the Internet, and each ACK would include a tag line that identifies the message type as ACK, as opposed to MSG or MAK, and contains the unique event ID. Note that ACK 311 are sent out from the adapter over the Internet, and each ACK 311 would include a tag line that identifies the message type as MSG, as opposed to ACK or MAK, and contains the unique event ID.

The adapter uses several threads for performing the various operations. One thread is the outbound subscribing thread 304. This thread subscribes the adapter to events and places these events into the outbound queue portion of the repository. This thread receive events from the adapter framework interface 20 via a specific callback issued by the broker in response to a subscription 321. When the event is received, this thread derives a unique event ID, creates a repository file with this name, and places the event into the outbound queue 302 with the outbound send state (OS) 312. Note that every event stored within the repository or transmitted over the Internet will be identified by this unique identifier. This thread also determines if the event itself is an acknowledgment for an event in the inbound queue that has been republished. Note that if this event is a framework level acknowledgment this thread re-queues the original event in the inbound repository file to the fully acknowledged (IA) state 313 from the IM state 319, and this thread sends ACK 311 on to the other domain. Note that upon receipt by the other domain, the ACK 311 will requeue the outbound repository from the OM state 316 to the OA state 318, via the inbound receiving thread 306. The ACK 311 will also be treated as an incoming event by the other domain, and thus queued in the inbound queue and published to the process adapter requesting acknowledgment. Note that this thread may not be a single thread. Each event that delivered to the channel adapter is assigned a outbound subscribing thread. Thus, multiple threads for separate events could be executing in an overlapping fashion.

Another thread is the outbound transmitting thread 305 that converts events within the outbound queue into Internet format messages, and then sends these messages to an SMTP server (or other server types) for transmission over the Internet (or other network types). For all events in the outbound queue 302 that have never been sent, i.e. those events with state OS 312, this thread generates an Internet format message MSG 314 from the event. Each MSG 314 would include a tag line that identifies the message type as MSG (i.e. the original event, as opposed to MAK or ACK) and contains the unique event ID. Note that the generated message may be stored in the queue 302 along with the event. Also note that multiple messages from different events may be combined into a single composite message. This thread then sends the MSG to the SMTP server for transmission over the Internet. If the message is accepted by the SMTP server, then this thread re-queues the repository event file to the partially acknowledged state OP 315 via PAK 307. If a HTTP or FTP single server is being used then this thread changes the state to the half-way acknowledged state 04317 via HAK 308. Note this thread generates the PAK if the SMTP server reports no error. If a MSG has been determined to have been lost in transit, i.e. still at states OP 315, OM 316, or OH 317, this thread will resend the message to the server.

Another thread is the inbound receiving thread 306 which receives Internet messages from an Internet server, and determines if these messages are events from the other domain or acknowledgments for events sent by this channel adapter. If a message is an event from the other domain, then this thread places that event in the inbound queue portion of the repository, republishes it 322 within the local publish/subscribe domain, and generates a MAK or ACK message 309 as appropriate. If the incoming message is an acknowledgment, i.e. ACK 310, ACK 311, or MAK 309, then this thread updates the message state in the outbound queue to outbound acknowledged channel adapter 318 or mostly acknowledged OM 316, as appropriate.

More specifically, the inbound receiving thread examines the tag line of the received messages. If the received message is MSG (has MSG in the tag line), then this thread creates a repository file named after the tag line, and loads the message into the file. The thread then decrypts or reformats the message back into the event and places the event into the inbound queue IR 303 with state set to inbound received 320. This thread also determines if the event itself is an acknowledgment, ACK 311, for an event in the outbound queue. If so, then this thread re-queues the outbound repository file from the mostly acknowledged state OM 316 to the fully acknowledged state OA 318. If the inbound message has MAK in the tag line, then this thread locates the file identified by the tag line in the outbound queue. If the file is in partially acknowledged state OP 315 or the half-way acknowledged state OH 317, then this thread re-queues the repository file to the mostly acknowledged state OM 316. This message will be ignored for all other outbound queue states. If the inbound message has ACK 310 in the tag line, then this thread locates the file identified by the tag line in the outbound queue. If the file is in the half-way acknowledged state OH 317, or mostly acknowledged state OM 316, then this thread re-queues the repository file to the fully acknowledged state OA 318. This message will be ignored for all other outbound queue states.

The inbound receiving thread also maintains the states of the events in the inbound queue 303. For all repository files in the inbound queue that have never been republished and have the inbound receive IR state 320, this thread sends back a MAK and requires the thread then to re-publish 322 the event within the local publish/subscribe domain by sending the event to the broker of the domain. If the event is of the unacknowledged type (framework level), then this thread send an ACK message 310 to the other domain and re-queues the repository file to the fully acknowledged state IA 313. If the event is of a manually or automatically acknowledged type (framework level), then no ACK is sent. For all repository files in the inbound queue that have been re-published, but not acknowledged (framework level) by an process within the local publish/subscribe domain (ID), this thread may do nothing or may try to re-publish the event. If publication is retried within the local domain, it may violate the assumed guaranteed message delivery on the part of the publish/subscribe engine in the domain. Therefore, the adapter should do nothing except diagnostic reporting in this state. If no violation would occur, then the thread would determine that the event has been in the mostly acknowledged (IM) state for more than the predetermined time. This thread would then re-publish the event within the local publish/subscribe domain. Once an ACK 311 is sent back to the adapter from the process, then the outbound subscribing thread 304 re-queues the event in the inbound queue from IM 319 to IA 313.

Another thread is the archiving thread (not shown). This thread is responsible for the long term archiving of events processed by the channel, and for the removal of old events from the repository. This thread scans the fully acknowledged repository states (OA and IA) for repository files that have not been archived, and then removes them and archives them to a storage device such as a hard disk or CD disk.

These elements operate as follows. Note that some of the tasks being performed by the various threads has been left out of the following description for the sake of brevity. Assume that a process adapter is publishing an event, for example an order for some product. Thus, the event will be delivered to the broker, which will publish the event within the domain and order the product. Since the administrator has connected the process adapter to the channel adapter, that business event will be received by the channel adapter, via the framework interface 20. The event 321 will be passed on the outbound subscribing thread 304. This thread then loads the event into the repository 301, specifically outbound queue 302, and assigned the OS state 312. The outbound transmitting thread periodically polls the queue for events with the OS state, (as well as OP and OH and OM state for re-sends). The outbound transmitting thread 305 forms an Internet message MSG 314 from the event in the outbound queue 302, and sends MSG to the Internet server for delivery to the other domain, via protocol interface 22. At this point, the outbound transmitting thread 305 re-queues the state from OS 312, to either OP 315 via PAK 307 or OH 317 via HAK 308, depending upon the protocol being used for Internet transmission. Note that with SMTP multiple servers are located between the Adapters, while with FTP only one server is between the adapters. Note that with TCP there are no intermediate servers; in other words there is direct connection between the channel adapters. Next the message MSG is received by the channel adapter on the other domain, via protocol interface 22. The inbound receiving thread 306 periodically polls the Internet server or post office protocol server, via the interface 22, to determine if there are any e-mail messages for the channel. If there is an e-mail message, the thread will bring the message into the inbound queue, convert it back into an event, set the event with the IR state 320 and sends a MAK back to the sending domain. The thread then publishes 322 the event to the broker on its domain, and sends back an acknowledgment to the sending adapter. If a framework level acknowledgment is required from a receiving process, then after the MAK message is sent, it will move the state of the event in the inbound queue from IR 320 to IM 319. The inbound receiving thread on the other domain will move the state of the event in the outbound queue from either OP 315 or OH 317 to OM 316. When the acknowledgment from the process is received, then the outbound subscribing thread 304 re-queues the event in the inbound queue from IM 319 to IA 313. The outbound thread also sends ACK 311 in the form of a MSG message back to the sending adapter. The inbound receiving thread 306 on the sending adapter receives ACK 311 in the form of a MSG message, and re-queues the outbound repository file from OM 316 to OA 318. If such an acknowledgment (framework level) is not required, then the thread will send an ACK message 310, and move the state of the event in the inbound queue from IR 320 to IA 313. The inbound receiving thread on the other domain will move the state of the event in the outbound queue from either OM 316 to OA 318.

Note that the invention has been depicted and described in terms of two channel adapters. However, a system could comprise any number of domains. Each domain would use a different channel adapter to communicate with another domain. For example, in a system with three domains A, B, C, domain A would need two channel adapters, one for B, and one for C. Similarly, domain B would need two channel adapters, one for A, and one for C, while domain C would also need two channel adapters, one for A, and one for B.

Further note that the PUB/SUB domains may operate differently from each other, e.g. they may have different PUB/SUB engines. Thus, the framework interfaces 20, 21 would be different, with each adapted to format the messages into events usable by their respective domains.

Further note that different network servers, e.g. SMTP and POP 3 servers, may be used for error reporting, and transmission retries.

Further note that a single domain can be subdivided into sub-domains, each of which would be treated as a separate administrative domain. Thus, communications within a corporation or other entity can be controlled with this invention.

Figure 4:
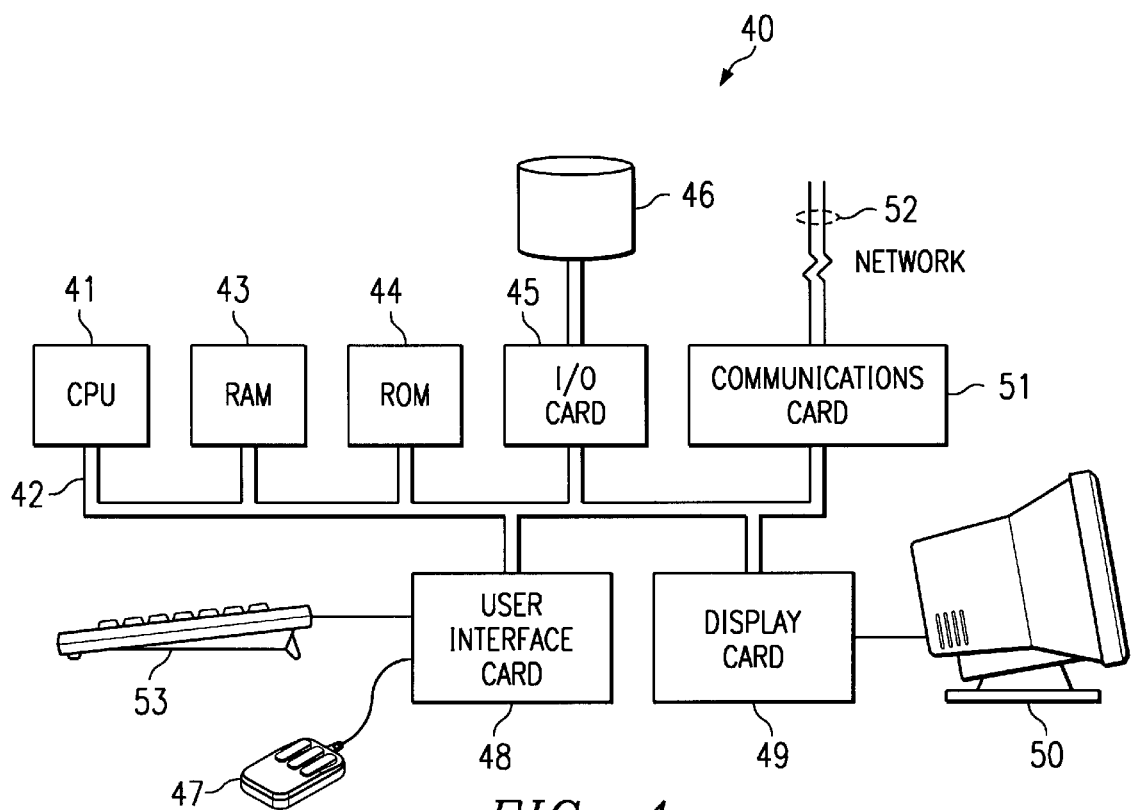
FIG. 4 depicts a high level block diagram of a computer system adapted to implement the present invention.

FIG. 4 illustrates a computer system 40 adapted to use one adapter of the present invention. A similar system would be used for the other adapter. In the system 40, central processing unit (CPU) 41 is coupled to bus 42. In addition, bus 42 is coupled to random access memory (RAM) 43, read only memory (ROM) 44, input/output (I/O) card 45, communications card 51, user interface card 48, and display card 49.

RAM 43 and ROM 44 hold user and system data and programs as is well known in the art. I/O card 45 connects storage devices, such as hard drive 46, to the computer system. Communications card 51 is used to connect the computer system to a local, wide-area, or Internet network 52. User interface card 48 couples user input devices, such as keyboard 53 and pointing device 47, to the computer system 40. Finally, display card 49 is driven by CPU 41 to control the display on display device 50. CPU 41 may be any general purpose CPU, such as a HP PA-8200. However, the present invention is not restricted by the architecture of CPU 41 as long as CPU 41 supports the inventive operations as described herein.

Although the present invention and its advantages have been described in detail, it should be understood that various changes, substitutions and alterations can be made herein without departing from the spirit and scope of the invention as defined by the appended claims.

What is claimed is:

1. A channel adapter for coupling a system to a network, the channel adapter comprising:

an inbound message queue for maintaining status of an inbound message being sent from the network to the system;

an outbound message queue for maintaining status of an outbound message being sent from the system to the network;

an outbound sending processor that formats the outbound message for transmission through the network and updates the status of the outbound message; and an inbound receiving processor that formats the inbound message for use by the system, updates the status of the inbound message, receives status information regarding the outbound message from the network, and updates the status of the outbound message.

2. The channel adapter of claim 1, wherein:

the outbound sending processor changes the status of the outbound message to a partially acknowledged state when the outbound sending processor sends the formatted outbound message to a network transmission server.

3. The channel adapter of claim 2, wherein:
the inbound receiving processor changes the status of the inbound message to inbound acknowledged when the inbound receiving processor sends the formatted inbound message to the system for distribution.

4. The channel adapter of claim 3, wherein:
the inbound receiving processor changes the status of the inbound message to inbound received when the inbound receiving processor receives the inbound message from the network.

5. The channel adapter of claim 4, wherein:
the inbound receiving processor changes the status of the outbound message to outbound acknowledged when the inbound receiving processor receives a status message via the network indicating the formatted outbound message has been received by a destination entity.

6. The channel adapter of claim 5, further comprising
an outbound receiving processor that receives the outbound message from the system, and initializes the status of the outbound message to outbound send.

7. The channel adapter of claim 6, wherein:
another channel adapter is connected to the network; and is a destination of the outbound message, and is the source of the inbound message.

8. The channel adapter of claim 7, further comprising
a repository for maintaining the outbound message and the inbound message.

9. The channel adapter of claim 8, wherein:
the system is a publication and subscription system and the network is the Internet.

10. A method for coupling a first system to a second system through a network using a first channel adapter connected between the first system and the network, and a second channel adapter connected between the second system and the network, the method comprising the steps of:
monitoring status of an inbound message being sent from the second system to the first system;
monitoring status of an outbound message being sent from the first system to the second system;
formatting the outbound message for transmission through the network to the second system, via a outbound sending processor resident on the first channel adapter;
updating the status of the outbound message, via the outbound sending processor resident on the first channel adapter;
formatting the inbound message for use by the first system, via an inbound receiving processor resident on the first channel adapter;
updating the status of the inbound message, via the inbound receiving processor resident on the first channel adapter;
receiving status information regarding the outbound message from the second system, via the inbound receiving processor resident on the first channel adapter; and
updating the status of the outbound message, via the inbound receiving processor resident on the first channel adapter.

11. The method of claim 10, further comprising the step of:
changing the status of the outbound message to a partially acknowledged state when the outbound sending processor sends the formatted outbound message to a network transmission server for transmission across the network to the second system, via the outbound sending processor.

12. The method of claim 11, further comprising the step of:
changing the status of the inbound message to inbound acknowledged when the inbound receiving processor sends the formatted inbound message to the first system for distribution, via the inbound receiving processor.

13. The method of claim 12, further comprising the step of:
changing the status of the inbound message to inbound received when the inbound receiving processor receives the inbound message from the network, via the inbound receiving processor.

14. The method of claim 13, further comprising the step of:
changing the status of the outbound message to outbound acknowledged when the inbound receiving processor receives a status message from the second system indicating the formatted outbound message has been received by the second system, via the inbound receiving processor.

15. The method of claim 14, further comprising the steps of:
receiving the outbound message from the first system, via an outbound receiving processor; and
initializing the status of the outbound message to outbound send, via the outbound receiving processor.

16. The method of claim 15, further comprising the step of:
maintaining the outbound message and the inbound message, via a repository.

17. The method of claim 16, wherein:
the first system and the second system are publication and subscription systems, and the network is the Internet.

18. A computer program product having a computer readable medium having computer program logic recorded thereon for coupling a first publication and subscription (PUB/SUB) system to a second PUB/SUB system through the Internet network using a first channel adapter connected between the first system and the network, and a second channel adapter connected between the second system and the network, the computer program product comprising:
means for monitoring status of an inbound message being sent from the second system to the first system;
means for monitoring status of an outbound message being sent from the first system to the second system;
repository for maintaining the outbound message and the inbound message;
an outbound sending processor that is resident on the first channel adapter which formats the outbound message for transmission through the network to the second system and updates the status of the outbound message; and
an inbound receiving processor that formats the inbound message for use by the first system, updates the status of the inbound message, receives status information regarding the outbound message from the second system, and updates the status of the outbound message.

19. The computer program product of claim 18, wherein:
the outbound sending processor changes the status of the outbound message to a partially acknowledged state when the outbound sending processor sends the formatted outbound message to a network transmission server for transmission across the network to the second system.

20. The computer program product of claim 19, wherein:
the inbound receiving processor changes the status of the inbound message to inbound acknowledged when the inbound receiving processor sends the formatted inbound message to the first system for distribution;
the inbound receiving processor changes the status of the inbound message to inbound received when the inbound receiving processor receives the inbound message from the network; and
the inbound receiving processor changes the status of the outbound message to outbound acknowledged when the inbound receiving processor receives a status message from the second system indicating the formatted outbound message has been received by the second system.

* * * * *